June 12, 1923.
J. M. YOUNG
TAKE-OUT AND DELIVERY DEVICE FOR GLASS BLOWING MACHINES
Filed Nov. 10, 1919 3 Sheets-Sheet 1
1,458,455
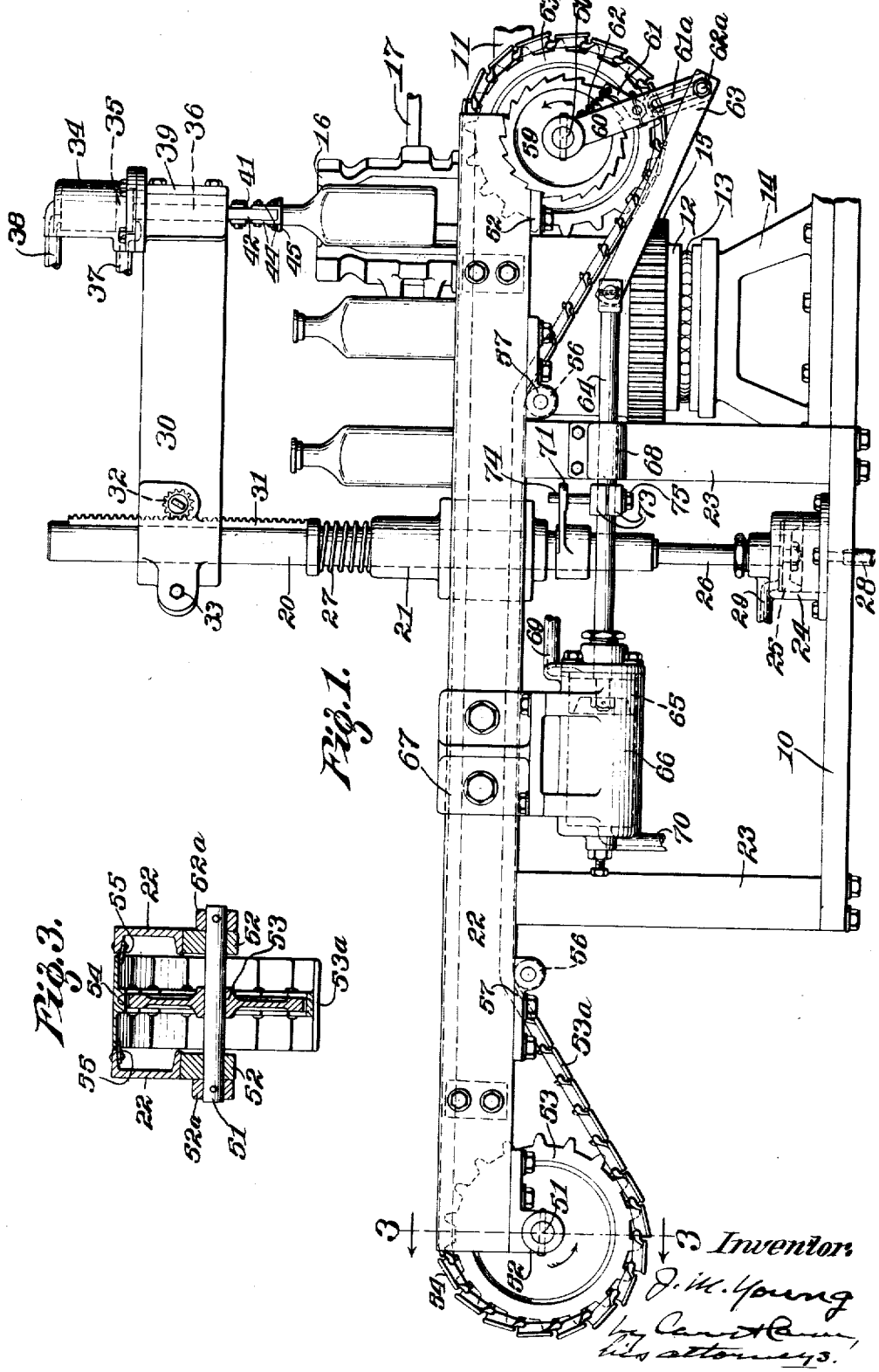

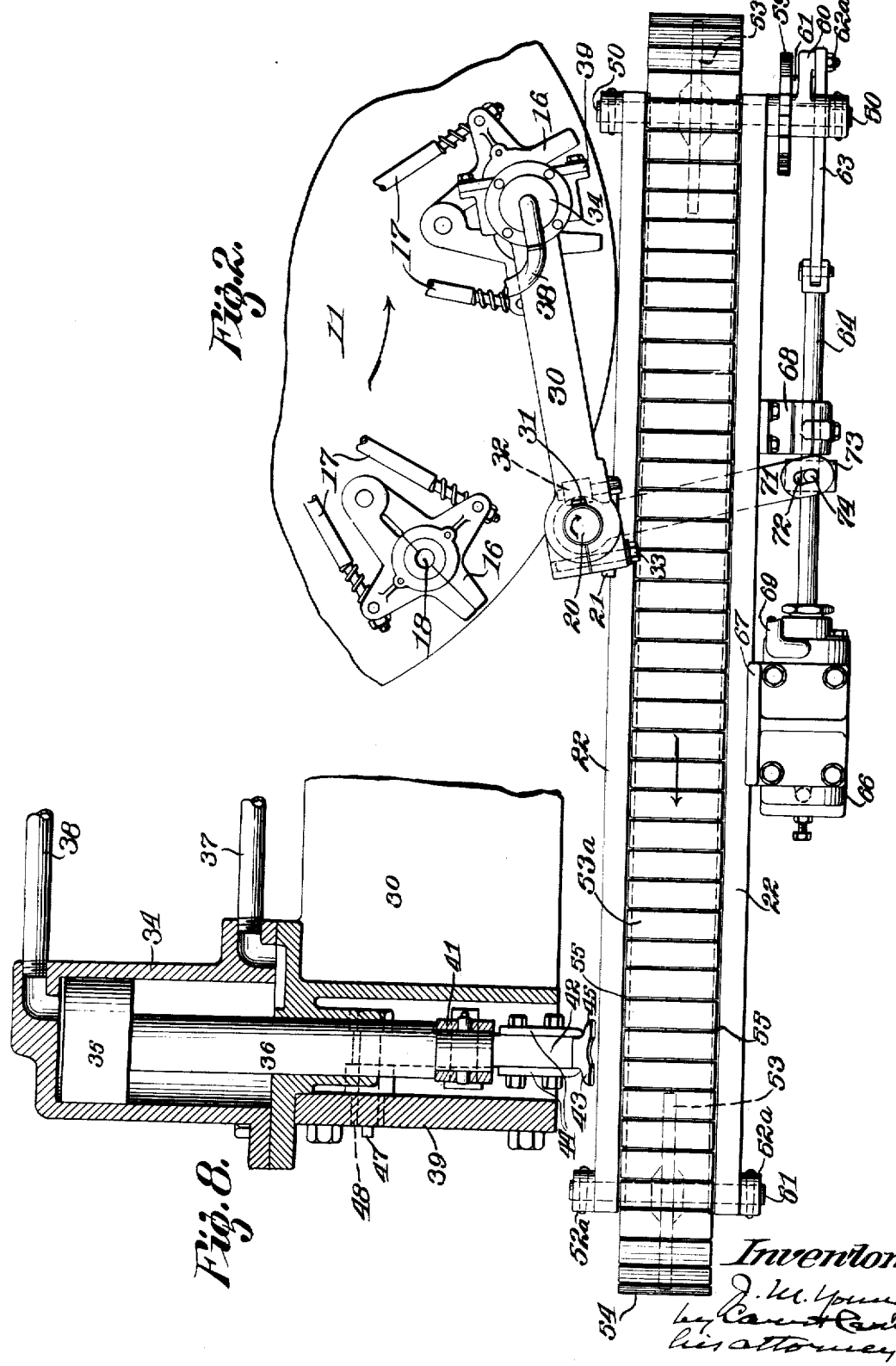

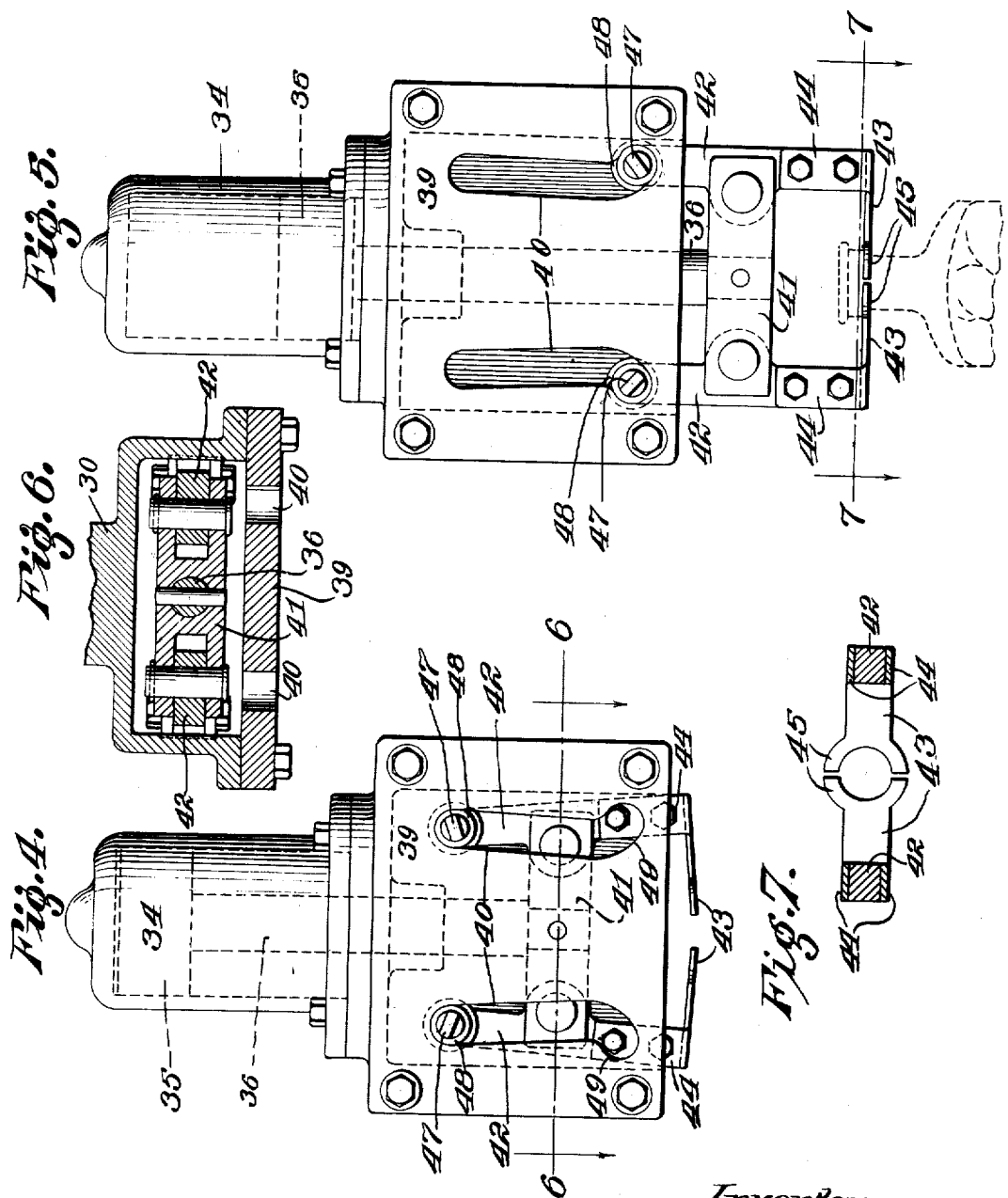

Patented June 12, 1923.

1,458,455

UNITED STATES PATENT OFFICE.

JAMES M. YOUNG, OF EAST ST. LOUIS, ILLINOIS, ASSIGNOR TO OBEAR-NESTER GLASS COMPANY, OF ST. LOUIS, MISSOURI, A CORPORATION OF MISSOURI.

TAKE-OUT AND DELIVERY DEVICE FOR GLASS-BLOWING MACHINES.

Application filed November 10, 1919. Serial No. 336,821.

*To all whom it may concern:*

Be it known that I, JAMES M. YOUNG, a citizen of the United States, and a resident of the city of East St. Louis, in the county of St. Clair and State of Illinois, have invented a new and useful Improvement in Take-Out and Delivery Devices for Glass-Blowing Machines, of which the following is a specification.

This invention relates principally to devices for removing and conveying articles from an automatic glass blowing machine, and is particularly designed for use in connection with the glass blowing machine shown and described in my pending application Serial No. 126,935, filed October 21, 1916, wherein the blank or parison is formed in a blank mold and then automatically transferred to a blow or finishing mold where it receives its final blowing.

One of the principal objects of the present invention is to provide an automatic device for removing the articles from the molds and conveying them away.

Another object of the invention is to arrange such automatic device for removing and delivering the articles from the glass blowing machine so as to be readily attachable to various types of glass blowing machines and operate in the proper time relation with respect to the other working parts of such glass blowing machine.

Another object is to provide for an adjustment whereby the article-removing device may be used for handling articles of different sizes.

Other objects and advantages of the invention appear in connection with the following description. The invention consists principally in means hereinafter set forth for removing the article from the mold and in means for conveying the same to a desired point; and it further consists in the combinations and arrangements of parts hereinafter described and claimed.

The accompanying drawings show a device embodying the preferred form of my invention applied to a machine for blowing the blank received from the blank-forming machine. In said drawings, wherein like symbols refer to like parts wherever they occur, Fig. 1 is a side elevation of a combined take-out and delivery device embodying my invention, the device being shown in connection with a blow-table of a bottle blowing machine, a bottle being shown lifted out of one of the open blow molds preparatory to being deposited upon the delivery device;

Fig. 2 is a top plan view of the combined take-out and delivery device, a portion of the blow-table having two molds mounted thereon being shown in connection therewith, the parts of the device being in the same position as that shown in Fig. 1;

Fig. 3 is a vertical section through the side rails of the conveyer frame, the section being taken through the sprocket-wheel at the delivery end of the frame on the line 3—3 in Fig. 1;

Fig. 4 is a detail end view of the finger casing at the outer end of the cross-arm and the cylinder which raises and lowers the fingers, the fingers being shown in raised position and moved apart;

Fig. 5 is a view similar to Fig. 4, the fingers being shown in lowered position and brought together around the neck of a bottle;

Fig. 6 is a horizontal section through the casing in which the bottle holding fingers are mounted, the section being taken through the cross head, which is operated by the finger operating cylinder, on the line 6—6 in Fig. 4;

Fig. 7 is a horizontal section taken through the bottle grasping fingers, the section being taken on the line 7—7 in Fig. 5; and Fig. 8 is a central vertical longitudinal section taken through the finger opening cylinder and finger casing.

Referring to the accompanying drawings, 10 designates a base of any desired shape, which may be stationary or may be supported on wheels, (not shown) for convenience in handling. The take-out or article-removing device embodying the invention is shown in connection with the rotary final blow-table 11 of the glass blowing machine which is shown and claimed in my application Serial No. 126,935 filed October 21, 1916, and to which reference is made for further description.

The blow-table 11 has a cylindrical hub portion 12 which is rotatably mounted on ball bearings 13 in a pedestal 14. The pedestal 14 is bolted or otherwise secured to the base 10 and the cylindrical portion 12 of the blow-table 11 is provided with a ring gear 15 which is intermittently driven by any suitable means. The blow or finishing molds 16, which may be of any desired number, are mounted on the blow-table and comprise two vertically hinged half sections connected by a hinge-pin so as to swing open and shut. The two half sections are provided with registering cavities of the shape desired to be imparted to the finished bottle and are automatically opened and closed by the drag links 17, which are preferably operated by a suitable cam means (not shown). The blow molds are also provided at their tops with openings 18 which register with a stationary blow head (not shown) in one of the stationary portions, wherein the bottle blank receives its final blowing.

The take-out or bottle removing device comprises a vertically reciprocable upright column or rock-shaft 20 journaled for rotation in a bearing 21 secured to one of a pair of horizontally disposed spaced channel irons 22 which form the longitudinal side rails of an endless chain conveyer. The spaced channel iron side rails 22 of the conveyer are arranged alongside of the blow-table with their web portions disposed vertically and with their top flanges slightly above the top of the blow-table 11. The spaced channel iron side rails are supported near each end by standards 23 which are bolted to the base 10 and bottom flange of the side rails 22. The bearing 21, in which the shaft 20 is journaled, is bolted or otherwise secured to the outside face of the side rail 22 that is located adjacent to the blow-table.

The upright shaft 20 is reciprocated in its bearing 21 by means of a cylinder 24 which is secured to the base 10 of the machine. This cylinder is located underneath the upright shaft 20, in axial alinement with the same, and is provided with a piston 25 working up and down in the cylinder, the piston rod 26 of which projects upward from the cylinder and engages the lower end of the upright shaft 20. The downward movement of the upright shaft 20 is cushioned by means of a coiled spring 27 which is sleeved on said shaft and is located between the upright bearing 21 and a collar secured to the shaft 20. A pipe 28 leads to the bottom of the cylinder 24 for admitting air beneath the piston to lift the upright shaft. Another pipe 29 leads to the top of the cylinder 24 for admitting air on top of the piston 25 to force it down and permit the upright shaft to drop due to its own weight.

Mounted on the upper end portion of the upright shaft 20, and arranged for vertical adjustment thereon, is a cross-arm 30. This vertical adjustment is accomplished by means of a rack 31 mounted on the upright shaft which is engaged by a pinion 32 journaled in the cross-arm 30. Thus, when it is desired to raise or lower the cross-arm 30, the pinion 32 is turned, thus causing the cross-arm to travel up and down on the rack 31. The portion of the cross-arm which embraces the upright is split and clamping bolts 33 are passed through the split portion to draw the same together and clamp the cross-arm 30 in the desired adjusted position on the upright shaft 20.

Mounted on the upper portion of the cross-arm, on the outer free end thereof, is a finger operating cylinder 34, which is provided with a piston 35 having a piston rod 36 extending downwardly from the cylinder 34. Air is supplied to the lower end of the cylinder 34 for raising the piston 35 by means of a pipe 37. Air is supplied to the top of the cylinder 34 for driving down the piston 35 by means of a pipe 38.

The outer end of the cross-arm 30 widens out and is provided with a recess which is closed by a cover plate 39 having a pair of spaced vertical cam slots 40 cut therein. The piston rod 36 passes through a boss in the top of the recess formed in the outer end of the cross-arm, and extends into said recess and has a longitudinally arranged cross head 41 secured to its lower end. This cross head has its opposite end portions bifurcated, and pivotally mounted between its bifurcated end portions are finger lever arms 42. Attached to the lower ends of the finger arms are oppositely disposed bottle grasping fingers 43, which are preferably shown in the form of flat plates made of spring metal, and have tabs 44 bent up on each side of the finger arms 42 and bolted or otherwise secured thereto. The fingers 43 have oppositely disposed concave or in-curved end portions 45 adapted to engage the neck of the bottles 46 on opposite sides thereof. The upper ends of the finger arms 42 are provided with studs 47 which project through the respective cam slots 40 in the cover plate 39 and have rollers 48 journaled thereon which fit in the cam slots. The lower portions of the cam slots 40 are curved outwardly away from each other as at 49 and are for the purpose of opening and closing the bottle grasping fingers 43. Thus when the piston 35 is in its uppermost position in the cylinder 31, the rollers on the pivoted finger arms are thrown up into the straight portions of the cam slots 40 causing the upper ends of the finger arms 42 to be brought together and thus causing the lower portions to be spread apart and the fingers 43 to separate. When the piston 35 is in its lowermost position in the cylinder 34, the rollers 48 at the upper ends of the finger arms 42 are drawn into the outwardly curved lower portions 49 of the cam slots 40 and thus cause the fingers 43 attached to the lower ends of the finger arms 42 to be brought together.

Mounted on horizontal shafts 50 and 51 journaled in bearings 52, which are secured to the under side of the side rails 22 at the respective front and rear ends of the conveyer, are sprocket wheels 53. These sprocket wheels are located midway between the side rails of the conveyer frame and the shafts 50 and 51 are prevented from slipping endwise of the bearings by means of collars 52ª. These sprocket wheels support an endless conveyer chain 53ª which is made up of links having portions adapted to be engaged by the teeth of the sprocket wheels and having laterally extending portions in the form of flights 54 which travel between the side rails of the conveyer. The tilting or sagging of the flights 54 in the upper portion of the chain is prevented by means of metal strips 55, which are riveted to the under side of the top flanges of the side rails, and project inwardly far enough past the outer ends of the flights to support the same. The sagging of the lower portion of the conveyer chain between the sprocket wheels is prevented by means of idler rollers 56 which are journaled in the bearings 57 bolted to the under sides of the side rails of the conveyer frame.

A ratchet wheel 59 is secured to the shaft 50 at the forward end of the conveyer outside of the outside rail of the conveyer frame. A ratchet arm 60, having a hub portion loosely sleeved on the shaft 50, is located outside of the ratchet wheel. This ratchet arm has a pawl 61 pivotally mounted thereon whose free end portions engage the teeth of the ratchet wheel. The outer end of the pawl is held in engagement with the teeth of the ratchet wheel by means of a coil spring 62, one end of which is secured to the ratchet arm and the other end of which is secured to the free end of the pawl. The outer free end of the ratchet arm 60 is provided with an elongated slot 61ª, which is widened out beneath the surface of the arm to receive the head of a T-bolt 62ª, which is slidably arranged therein. The shank portion of the bolt 62ª projects outwardly beyond the slot 61ª and extends through a hole in one end of a link 63. A nut is threaded on the outer end of the bolt for clamping the bolt in any desired position in the slot 61ª formed in the ratchet arm 60.

The other end of the link 63 is pivotally secured between the bifurcated outer end portions of a horizontally arranged piston rod 64 having a piston 65 working in a horizontally disposed cylinder 66. This cylinder operates the sprocket rotating mechanism hereinbefore described and is supported from the conveyer frame by means of a bracket 67, which is bolted or otherwise secured to the outside face of the outermost rail 22 of the conveyer frame. This piston rod, due to its length, is supported midway between its ends by means of an additional bearing 68 which is bolted to the side face of the standard 23 which supports the forward end of the conveyer frame. A pipe 69 leads to the head (right hand) end of the cylinder 66 for throwing the piston 65 to the left, and another pipe 70 leads to the rear (left hand) end of the cylinder for throwing the piston forward.

This cylinder also rotates the upright shaft 20 to swing the take-out mechanism from its normal position over the mold 16 to a position over the conveyer chain 53ª. This is accomplished by means of a horizontally extending rock-arm 71, one end of which is sleeved on the upright shaft 20 and pinned thereto, and the other end of which extends over the piston rod 64 and is provided with an elongated slot 72. The outer end of the arm is secured to the piston rod 64 of the cylinder 66 by means of a pair of clamping blocks or plates 73 which are arranged above and below the piston rod and are grooved to straddle the same. The upper plate has a pin 74 projecting upwardly therefrom which projects through the slot 72 in the outer end of the arm 71, thus connecting the arm to the piston rod. This forms a slot and pin connection between the piston rod 64 and the rock-arm 71 which permits vertical movement of the arm 71 with respect to the piston rod without these members becoming disengaged. The plates 73 may also be clamped in any desired position along the length of the piston rod 64 by means of clamping bolts 75 which pass through one plate and are threaded into the other plate. Thus, with this connection between the upright shaft 20 and the piston rod 64, when the piston 65 is thrown forward in the cylinder 66, the upright rock-shaft 20 is rotated anti-clockwise and the cross-arm 30 which carries the bottle grasping fingers 43 is swung over the open mold 16 and the upper portion of the conveyer chain is moved towards the delivery end of the conveyer (as shown in Figs. 1 and 2); and when the piston 65 is thrown backwards in the cylinder, the upright shaft 20 is rotated in a clockwise direction and the cross-arm 30 is swung over the conveyer while the conveyer chain remains stationary.

The rotatable blow mold table 11 shown in the drawings is adapted to support six of the molds 16, two of which are shown in Fig. 1, one being shown closed and the other being shown in open position beneath the bottle grasping fingers 43 at the outer end of the cross-arm 30. The table is automatically rotated intermittently 60 degrees towards the right, and its position with respect to the bottle grasping fingers is such that an open mold containing a finished bottle is located directly beneath the bottle grasping fingers at the end of each 60 degree rotation of the blow table.

The parts of the machine, except the piston 35 in the finger operating cylinder 34 and the piston 25 which raises and lowers the shaft 20, are shown in their normal positions, and it will be noted that the proper time intervals between the various working parts and the sequence of their operation are all controlled by suitable control valves (not shown) to which the pipes leading to the different operating cylinders are connected.

Assuming the various working parts of the device to be in normal position, the operation of the device is as follows: The blow table, at the beginning of the bottle removing operation, is in its stationary position with an open mold containing a completed bottle positioned directly below the bottle grasping fingers at the end of the cross-arm, which in its normal position overhangs an open mold. Air is then admitted to the pipe 38 which leads to the top of the finger operating cylinder 34, thus forcing the piston 35 and bottle grasping fingers 43 downwardly and the bottle grasping fingers, by reason of the curvature of the cam slots 40 in the cover plate, are brought together and close around the neck of the bottle.

Air is then admitted to the pipe leading to the bottom of the cylinder 24 and the piston 25 therein is forced upwardly, thus raising the whole of the take-out mechanism, which includes the upright shaft 20, the cross-arm 30 and the finger operating cylinder 34, together with the bottle grasping fingers 43 operated thereby. This action raises the bottle clear of the annular recess in the bottom plate of the mold.

Air is then admitted to the forward end of the horizontal take-out rotating and conveyer operating cylinder 66 through the pipe 69 and drives the piston 65 working in said cylinder backwards. This action causes the outer end of the rock-arm 71 attached to the upright shaft 20 of the take-out or bottle transferring mechanism to travel backwardly with the piston rod 64 and rotate the upright rock-shaft 20 far enough to the right to swing the outer end of the cross-arm over the conveyer chain with the bottle suspended above the flights thereof. During the backward movement of the piston 65, no movement is imparted to the conveyer chain by reason of the pawl 61 sliding over the teeth of the ratchet wheel 59.

Air is then admitted to the pipe 37 which opens into the lower part of the finger operating cylinder 34 below the piston 35 therein, and causes the bottle grasping fingers 43 to separate quickly, by reason of the abrupt curves in the bottle of the cam slots, as the fingers begin their upward movement. Upon separation of the fingers, the bottle is released and drops upon the flights of the conveyer chain.

Air is then admitted to the rear end of the cylinder 66 through the pipe 70 and throws the piston forward, and the upright shaft 20, due to its connection with the piston rod 64, is rotated to the left and the cross-arm 30 swung back into position over the next open mold. The forward movement of the piston 65 also causes the conveyer chain to travel a short distance towards the delivery end of the conveyer and thus carry the bottle just deposited thereon out of the path of the next bottle to be swung into position over the conveyer chain. This rearward movement of the top portion of the conveyer chain as the piston 65 moves forward, is accomplished by means of the connection between the piston rod 64 and the ratchet wheel 59 which is formed by the link 63, the ratchet arm 60 and the pawl 61. Thus, when the ratchet arm 60 is swung forward by the piston rod 64, the pawl 61 pivoted thereon engages the teeth of the ratchet wheel 59 and rotates the ratchet wheel, together with the shaft to which it is secured, to the right. Thus, the sprocket-wheel 53 secured to the forward shaft 50 is rotated and causes the upper portion of the conveyer chain to travel towards the delivery end of the conveyer. The forward sprocket constitutes the drive sprocket, while the sprocket of the delivery end of the conveyer simply supports the conveyer chain that is nothing more than an idler.

The upright shaft 20 together with the cross-arm 30 is then lowered by forcing down the piston 25 in the cylinder 24 by admitting air into the top of the cylinder 24 through the pipe 29. Thus, the upright shaft 20, being no longer supported on the upper end of the piston rod 26, is permitted to slowly drop by reason of the cushioning action of the coil spring 27. This completes the cycle of operation, and all the parts having returned to their normal position, the hereinbefore described operation is repeated.

It will be noted that the take-out or transfer device is adjustable for handling glass articles of different heights by reason of the rack and pinion connection between the cross-arm and the upright rock-shaft 20, and that the travel of the conveyer chain may be lengthened or shortened without changing the throw of the piston 65 in the horizontal cylinder 66 by adjusting the T-bolt 62ª, which connects the link 63 with the ratchet arm 60.

The bottle blowing machine shown in connection with the transferring and conveying device is shown only as an example, therefore, I do not wish to be limited thereto as the device is equally adapted for use in connection with various forms of glass blowing machines adapted to blow various glass articles.

The invention is not restricted to the details of construction and arrangement of parts shown and described.

What I claim is:

1. In a glass blowing machine, the combination of a movably mounted mold, a combined take-out and delivery mechanism arranged adjacent thereto, said take-out mechanism comprising a vertically reciprocatable upright shaft having a vertically adjustable horizontally disposed cross-arm secured thereto, and adapted to overhang said mold, means for adjusting the height of said cross-arm with respect to said mold, pressure operated means on said arm adapted to engage an article in said mold, pressure operated means for raising and lowering said upright shaft, means for cushioning said shaft in its downward movement, and pressure operated means for rotating said shaft to swing said cross-arm over said delivery mechanism.

2. In a glass blowing machine, the combination of a movably supported mold, a take-out mechanism comprising a vertically reciprocatable upright shaft having a horizontally disposed cross-arm adapted to overhang the mold in one position of its movement, means for intermittently rotating said shaft, a piston located beneath said shaft for raising and lowering the same, a piston mounted on the outer end of said cross-arm, and article grasping fingers pivoted to said piston, said cross-arm having cam slots engaged by said fingers whereby upward movement of the piston will raise the fingers and cause them to separate and downward movement of the piston will lower said fingers and will cause them to be brought together.

3. In a glass blowing machine, the combination of a movably supported mold, a take-out mechanism comprising a rotatable upright shaft having a horizontally disposed cross-arm secured thereto and adapted to overhang a mold in one position of its movement, fingers mounted on the outer end of said cross-arm and adapted to grasp an article in said mold, means for opening and closing said fingers, means for intermittently rotating said shaft to swing said cross-arm away from said mold and for returning said arm to its position over said mold, means for adjusting the height of said cross-arm with respect to said mold, said adjusting means comprising a rack on said upright shaft and a pinion adapted to engage said rack, and means for holding said cross-arm in adjusted position on said upright shaft.

4. In a glass blowing machine, the combination with a movably supported mold of a take-out mechanism comprising a vertically reciprocatable upright rock-shaft having a cross-arm adjustably mounted thereon and adapted to overhang said mold in one position of its movement and having a horizontally disposed rock-arm, article grasping fingers mounted on said cross-arm, a finger operating piston mounted on said cross-arm, a piston for raising and lowering said rock-shaft, a piston for rocking said rock-shaft, means for connecting the rock-arm of said rock-shaft to said last mentioned piston to maintain the connection between said parts during the raising and lowering of said rock-shaft, and means for cushioning said rock-shaft during its downward movement.

5. In a glass blowing machine, the combination with a movably supported mold, of a combined take-out and conveying mechanism, said take-out mechanism comprising an upright rock-shaft having a cross-arm, fingers mounted on said cross-arm and adapted to engage an article in said mold, means for operating said fingers, and a piston operatively connected to said rock-shaft for rocking said rock-shaft to swing said cross-arm from a position over said mold to a position over said conveying mechanism and back again, said piston being operatively connected to said conveying mechanism to actuate the same only when rocking the rock-shaft to swing the cross-arm over said mold.

6. In a glass blowing machine, the combination with a movably supported mold and an endless conveyer of a take-out mechanism comprising a vertically reciprocatably upright rock-shaft having a cross-arm adapted to swing over said mold and said conveyer, article engaging fingers mounted on said cross-arm, a piston for actuating said fingers, a piston for raising and lowering said rock-shaft, a piston connected to said rock-shaft for rocking the same to swing said arm from a position over the mold to a position over the conveyer and back again, means for adjusting the length of swing of said cross-arm, said piston being operatively connected to said conveyer to operate the same only when rocking the rock-shaft to swing said cross-arm from its position over the conveyer to its position over said mold, and means for adjusting the movement of said conveyer without affecting the swing of said cross-arm.

7. In a glass blowing machine, the combination of a movably mounted mold, a take-out mechanism comprising an upright shaft having a cross-arm adjustably secured thereto for rotation therewith and adapted to overhang the mold in one position of its movement, means for intermittently rotating said shaft, a piston mounted on the outer end of said cross-arm, and article grasping fingers pivotally supported on said piston, said cross-arm having cam slots engaged by said fingers, whereby upward movement of the piston will raise the fingers and cause them to separate, and downward movement of said piston will lower said fingers and cause them to be brought together.

Signed at St. Louis, Missouri, this 4th day of November, 1919.

JAMES M. YOUNG.

Certificate of Correction.

It is hereby certified that in Letters Patent No. 1,458,455, granted June 12, 1923, upon the application of James M. Young, of East St. Louis, Illinois, for an improvement in "Take-Out and Delivery Devices for Glass-Blowing Machines," errors appear in the printed specification requiring correction as follows: Page 2, line 98, for the word "longitudinally" read *horizontally;* page 4, line 70, for the word "bottle" read *bottom;* and that the said Letters Patent should be read with these corrections therein that the same may conform to the record of the case in the Patent Office.

Signed and sealed this 24th day of July, A. D., 1923.

[SEAL.]

WM. A. KINNAN,
*Acting Commissioner of Patents.*